US005276763A

United States Patent [19]

Göbel et al.

[11] Patent Number: 5,276,763

[45] Date of Patent: Jan. 4, 1994

[54] INFRARED RADIATOR WITH PROTECTED REFLECTIVE COATING AND METHOD FOR MANUFACTURING SAME

[75] Inventors: Wolfgang Göbel; Klaus Schmitz; Wolfgang Wild, all of Hanau, Fed. Rep. of Germany

[73] Assignee: Heraeus Quarzglas GmbH, Hanau, Fed. Rep. of Germany

[21] Appl. No.: 949,334

[22] Filed: Sep. 22, 1992

Related U.S. Application Data

[63] Continuation of Ser. No. 660,489, Feb. 25, 1991, abandoned.

[30] Foreign Application Priority Data

Jul. 9, 1990 [DE] Fed. Rep. of Germany ....... 4021798

[51] Int. Cl.[5] .......................... H05B 3/44; F24C 7/04; G02B 1/00; G02B 1/10

[52] U.S. Cl. .................................... 392/422; 392/424; 392/407; 313, 113

[58] Field of Search ............... 392/422, 424, 407, 408; 313, 15, 45, 113, 312, 635, 489; 338, 234

[56] References Cited

U.S. PATENT DOCUMENTS

| | | | |
|---|---|---|---|
| 2,247,409 | 7/1941 | Roper | 313/112 |
| 2,859,369 | 11/1958 | Williams et al. | 313/112 |
| 3,209,192 | 9/1965 | Decker | 313/112 |
| 3,221,198 | 11/1965 | Van der Wal et al. | 313/112 |
| 3,666,534 | 5/1972 | Groth et al. | 313/112 |
| 3,748,518 | 7/1973 | Lewis | 313/112 |
| 4,337,990 | 7/1982 | Fan et al. | 204/192 P |
| 4,340,646 | 7/1982 | Ohno et al. | 428/429 |
| 4,346,323 | 8/1982 | Hirschfield | 313/112 |
| 4,448,855 | 5/1984 | Senaha et al. | 428/632 |
| 4,497,700 | 2/1985 | Groth et al. | 428/426 |
| 4,524,410 | 6/1985 | Kawakatsu et al. | 362/293 |
| 4,588,923 | 5/1986 | Hoegler et al. | 313/112 |
| 5,003,284 | 3/1991 | Dieudonné | 338/237 |

FOREIGN PATENT DOCUMENTS

| | | | |
|---|---|---|---|
| 1540818 | 9/1971 | Fed. Rep. of Germany . | |
| 2637338 | 8/1979 | Fed. Rep. of Germany . | |
| 1541980 | 3/1979 | United Kingdom | 392/424 |
| 1544551 | 4/1979 | United Kingdom . | |
| 79/00424 | 7/1979 | World Int. Prop. O. | 313/112 |

OTHER PUBLICATIONS

Heraeus Quanrzchmelze PIR-B20 Kurzwellige Intrarotstrahler aus Hanauer Quarzglas.

Heraeus Quarzchmelze PIR-B10 Mittelwellige Zwillingsrohr-Infrarotstrahler.

*Primary Examiner*—Bruce A. Reynolds
*Assistant Examiner*—John A. Jeffery
*Attorney, Agent, or Firm*—Felfe & Lynch

[57] ABSTRACT

In infrared radiators whose heater is disposed in an envelope tube of transparent or opaque fused vitreous silica, radiation losses can be reduced by a reflective coating, for example of gold, placed on the envelope tube. To improve the thermal stability of the reflective coating, a protective coating of zirconium, silicon and/or tin dioxide is proposed. The protective coating can be made by using thermally degradable organic zirconium, silicon and/or tin compounds.

3 Claims, 1 Drawing Sheet

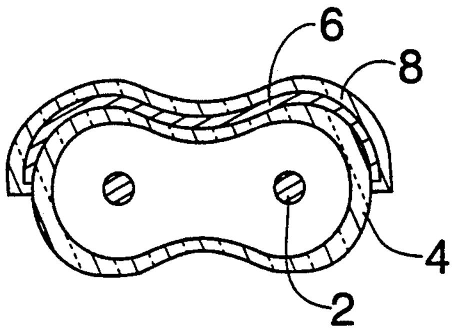
6
8
4
2

INFRARED RADIATOR WITH PROTECTED REFLECTIVE COATING AND METHOD FOR MANUFACTURING SAME

This application is a continuation of application Ser. No. 07/660,489 filed Feb. 25, 1991, now abandoned.

BACKGROUND OF THE INVENTION

The invention relates to an infrared radiator with a heater disposed in an envelope tube of clear or opaque fused vitreous silica and a metallic reflective coating applied to the back of the envelope tube, and a method for its manufacture.

Infrared radiators whose heater is surrounded by a envelope tube of clear or opaque fused vitreous silica are disclosed, for example, in German Patents 1,540,818 and 38 41 448 (to which U.S. Pat. No. 5,003,284 corresponds). To reduce lateral and back radiation losses the envelope tube can be provided on its back with a reflective coating of metal, such as aluminum or gold. Infrared radiators of this kind are described also in the prospectuses of Heraeus Quarzschmelze GmbH "Kurzwellige Infrarotstrahler aus Hanauer Quarzglas" (PIR-B 20) and "Mittelwellige Zwillingsrohr-Infrarotstrahler" (PIR-B 10).

It has been found that the metallic reflective coatings are not sufficiently stable in infrared radiators operating under very severe loads, and are gradually destroyed.

One possibility for preventing the destruction of the reflective coating of an infrared radiator is disclosed in German Patent 26 37 338. The infrared radiator has, in addition to the envelope tube of transparent or opaque fused vitreous silica surrounding the heater, a cooling tube through which a coolant flows. The reflective coating is situated on the cooling tube and is thus protected against destruction by evaporation.

SUMMARY OF THE INVENTION

It is the purpose of the invention to find an infrared radiator of the kind described above, whose reflective coating is more stable under thermal stress without requiring an additional cooling tube or other complex constructional measures. Moreover, it is to make available a simple-to-execute method for the production of such an infrared radiator.

The reflective coating is provided with a protective coating of zirconium dioxide, silicon dioxide, tin dioxide or a mixture of at least two of these oxides.

BRIEF DESCRIPTION OF THE DRAWING

The sole FIGURE shows an infrared radiator according to the invention.

DETAILED DESCRIPTION OF THE PREFERRED EMBODIMENT

The FIGURE shows a typical infrared radiator having conductors 2 disposed in a fused vitreous silica envelope tube 4 having a reflective metallic coating 6 of gold on the outside. A protective coating 8 is present over the metallic coating 6.

The infrared radiator has proven practical when the thickness of the protective coating amounts to 0.05 to 3 micrometers. The protective coating is preferred with a thickness of 0.1 to 0.3 micrometers.

The protective coating can consist either of the individual oxides, namely zirconium, silicon or tin dioxide, or of a mixture of two or all three of these oxides. If an oxide mixture forms the protective coating, the amount of the individual oxides therein can be selected however desired.

The protective coating of zirconium dioxide has proven especially good, since it not only improves the thermal stability of the reflective coating, but also possesses additional advantageous properties, such as a very good strength of adhesion, for example.

The protective coating is suitable for all metallic reflective coatings applied to the envelope tube of infrared radiators. It has proven especially good on reflective coatings consisting of gold, palladium, platinum, gold-palladium alloy or gold-platinum alloy.

Surprisingly, in the case of an infrared radiator operating for more than 1000 hours, the reflective action of the reflective coatings, provided with the protective coating according to the invention, is clearly better than that of the reflective coatings without a protective coating. The unprotected reflective coatings are partially destroyed, and the metal still present is no longer in the form of a coherent coating.

The infrared radiator according to the invention can be used to advantage also for drying materials containing solvents, since its reflective coating is protected by its coating also against solvent vapors. At the same time, the mechanical strength is improved, so that the reflective coating is not so easily damaged by handling the radiator.

The method of producing the infrared radiator provided with a protected reflective coating on its envelope tube in accordance with the invention is characterized in that a thermally degradable organic zirconium, silicon or tin compound or a mixture of at least two of these compounds is applied and fired on at 600° to 950° C.

Preferably, the application and firing are repeated one or more times, because the density of the protective coating and hence the thermal stability of the metallic reflective coating can be improved thereby.

Suitable thermally degradable organic zirconium, silicon and tin compounds which are transformed to the corresponding oxide by the firing are, for example, alcoholates, complex compounds with aliphatic diketones such as acetylacetone, and resinates and salts of aliphatic and aromatic carboxylic acids. Preferred are the resinates and salts of octanic acid and also, as silicon compounds, silicone resins.

Preferably the thermally degradable organic zirconium, silicon and tin compounds are used together with an organic vehicle in which the compounds are soluble and which are totally burned away or evaporated in the firing.

The organic vehicle is known in itself, and consists of organic solvents, ethereal oils, resins and the like. Examples are methyl ethyl ketone, cyclohexanone, ethyl acetate, amyl acetate, cellosolve (ethylene glycol ether), butanol, nitrobenzene, toluene, xylene, petroleum ether, chloroform, carbon tetrachloride, various terpenes such as pinene, dipentene, dipentene oxide and the like, ethereal oils such as lavender oil, rosemary oil, anise oil, sassafras oil, wintergreen oil, fennel oil and turpentine oil, Assyrian asphalt, various pine oils and balsams, as well as synthetic resins and mixtures thereof (see German Patent 12 86 866).

The solvents consisting of organic vehicles and zirconium, silicon and/or tin compounds are applied to the reflective coating, for example, by impression, rolling, spraying, brushing or coating with a sponge.

By the method thus made available, an infrared radiator with a protected metallic reflective coating in accordance with the invention can be made in a simple manner and without great investment in apparatus. Since the zirconium, silicon and tin compounds used in the method and the organic vehicle do not react with the metal of the reflective layer during the firing, the properties of the metal that are important to the reflective action are not impaired by the application of the protective coating. The protective coatings obtained by the firing are uniformly thick and dense and adhere well to the reflective coating.

DETAILED EXAMPLES

In further explanation, three examples are given below for the practice of the method of the invention, in connection with the preparation of test pieces (sections of envelope tube) provided with a protected reflective coating, and with the determination of the thermal stability of these test pieces and of infrared radiators in accordance with the invention.

EXAMPLE 1

A solution of 70.6 g of zirconium octanoate dissolved in test benzine, 8.5% zirconium content, and 29.4 g turpentine oil is applied with a brush to the gold coating of an envelope tube section of transparent fused silica externally gilded half-way around, and is fired at 800° C. for 15 minutes. The thickness of the protective coating thus produced is approximately 0.15 micrometers.

EXAMPLE 2

A solution consisting of 26.0 g of silicone resin, 23% Si, and 74 g of pine oil and containing 6% silicon is sprayed onto the gold coating of an envelope tube section of transparent fused silica externally gilded half-way around, and is fired at 800° C. for 15 minutes. The thickness of the protective coating thus produced is approximately 0.1 micrometer.

EXAMPLE 3

A solution of 14.8 g of tin octanoate containing 27% Sn, 12.0 g of dammar and 70.2 g of pine oil is brushed onto the gold coating of an envelope tube section of transparent fused silica externally gilded half-way around, and is fired at 800° C. for 15 minutes. The thickness of the protective coating thus produced is approximately 0.1 micrometer.

THERMAL STABILITY

To test for thermal stability the partially gilt envelope tube sections provided with a protective coating in accordance with the examples and, for comparison therewith, envelope tube sections partially gilt in the same manner but having no protective coating, are exposed for 4 hours to a temperature of 1000° C. and then visually examined. The envelope tube sections provided with the protective coating according to the invention have a more tightly closed and denser gold coating than the envelope tube sections without the protective coating.

Short-wave infrared radiators and medium-wave twin-tube infrared radiators of Hanau transparent fused vitreous silica bearing a reflective coating of gold on their backs are provided, as described in the examples, with protective coatings of zirconium dioxide, silicon dioxide and tin dioxide, respectively. These infrared radiators in accordance with the invention, plus, for comparison therewith, infrared radiators made in the same manner but with no protective coating, are operated for 1000 hours and then visually inspected. The infrared radiators with the protective coatings have more tightly closed and denser gold reflective coatings than those without protective coating.

We claim:

1. Infrared radiator with heater disposed in an envelope tube of fused vitreous silica and a metallic reflective coating applied to the back of the envelope tube, characterized in that the reflective coating consists of at least one of gold, palladium, platinum, a gold-palladium alloy and a gold-platinum alloy and is provided with a protective coating directly thereon, said protective coating consisting of at least one of zirconium dioxide, silicon dioxide, and tin dioxide, and the thickness of the protective coating is 0.05–3 micrometers.

2. Infrared radiator according to claim 1, characterized in that the thickness of the protective coating is 0.1–0.3 micrometers.

3. Infrared radiator according to claim 1, characterized in that the protective coating consists of zirconium dioxide.

* * * * *